US005549348A

United States Patent [19]

Posa

[11] Patent Number: 5,549,348

[45] Date of Patent: Aug. 27, 1996

[54] DOOR CLOSER MECHANISM FOR A VEHICLE

[75] Inventor: Andrew W. Posa, Grosse Ile, Mich.

[73] Assignee: Ford Motor Company, Dearborn, Mich.

[21] Appl. No.: 538,657

[22] Filed: Oct. 3, 1995

[51] Int. Cl.$^6$ .......... B60J 5/04

[52] U.S. Cl. .......... 296/146.4

[58] Field of Search .......... 296/146.4, 146.11, 296/146.1

[56] References Cited

U.S. PATENT DOCUMENTS

| | | | |
|---|---|---|---|
| 1,122,317 | 12/1914 | Simmons . | |
| 1,589,410 | 6/1926 | Milner | 296/146.4 |
| 1,806,488 | 5/1931 | Nagao . | |
| 1,969,767 | 8/1934 | Steele . | |
| 1,991,611 | 2/1935 | Gano, Jr. | 296/146.4 |
| 2,086,025 | 7/1937 | Gano, Jr. | 296/146.4 |
| 2,700,569 | 1/1955 | Koefoed | 296/146.4 X |
| 3,076,675 | 2/1963 | Lagace | 296/146.4 X |
| 5,002,331 | 3/1991 | Frye et al. | 296/146.4 |

*Primary Examiner*—Joseph D. Pape
*Attorney, Agent, or Firm*—Daniel M. Stock

[57] ABSTRACT

A door closer mechanism, particularly for heavy trucks, provides closer mechanism (30) having a pedal (32) for drawing a cable (36) in tension. The door (16) of the truck (10) includes a hinge (18) mounted on the body (12) of the truck (10), and the cable (36) drivingly engages an arm (26) of the hinge (18) to effect closure of the door (16).

10 Claims, 2 Drawing Sheets

DOOR CLOSER MECHANISM FOR A VEHICLE

BACKGROUND OF THE INVENTION

It is routine in the operation of automotive vehicles for an occupant, particularly a driver, to enter the vehicle by opening the door, seating herself or himself, and grasping a portion of the door on its interior side to pull the door to a closed position. In large vehicles, however, particularly in heavy trucks, the door may be swung to an open position in which grasping the door by the occupant for effecting closure may be difficult or awkward.

Devices have been developed in the automotive industry for providing assistance in the closing of pivotally mounted side doors of a vehicle. None of these devices have been found to be suitable in the heavy truck environment. An example of such proposed design may be seen in U.S. Pat. No. 5,002,331, which in particular suffers from the disadvantage occasioned by providing a flexible link between an operator of a door closer mechanism and the door to be closed. This fails to provide the robust connection characteristic desirable in the rugged heavy truck environment, and, furthermore, requires the design of special mechanisms associated with the flexible interconnection that are not commonly available in the automotive and heavy truck environments.

SUMMARY OF THE INVENTION

Responsive to the deficiencies in the prior art, the present invention provides a door closer for an automotive vehicle which includes a hinge assembly mounted on the body of the vehicle for carrying the vehicle door in pivotable relationship, and a closer mechanism, also mounted on the body of the vehicle and being connected to the hinge mechanism and operative to permit free movement of the door between the closed and the open position and to drivingly engage the hinge assembly for drawing the door from the closed to the open position.

According to one feature of the present invention, the closer mechanism includes a cable having one end fixedly secured to the hinge assembly and another end.

According to another feature of the present invention, the closer mechanism includes a pivotally mounted pedal fixedly secured to the other end of the cable.

BRIEF DESCRIPTION OF THE DRAWINGS

These and other advantages and features of the invention will be apparent to those skilled in the automotive body closure arts upon reading the following description, with reference to the accompanying drawings, in which.

DESCRIPTION OF THE PREFERRED EMBODIMENTS

Figure 1:
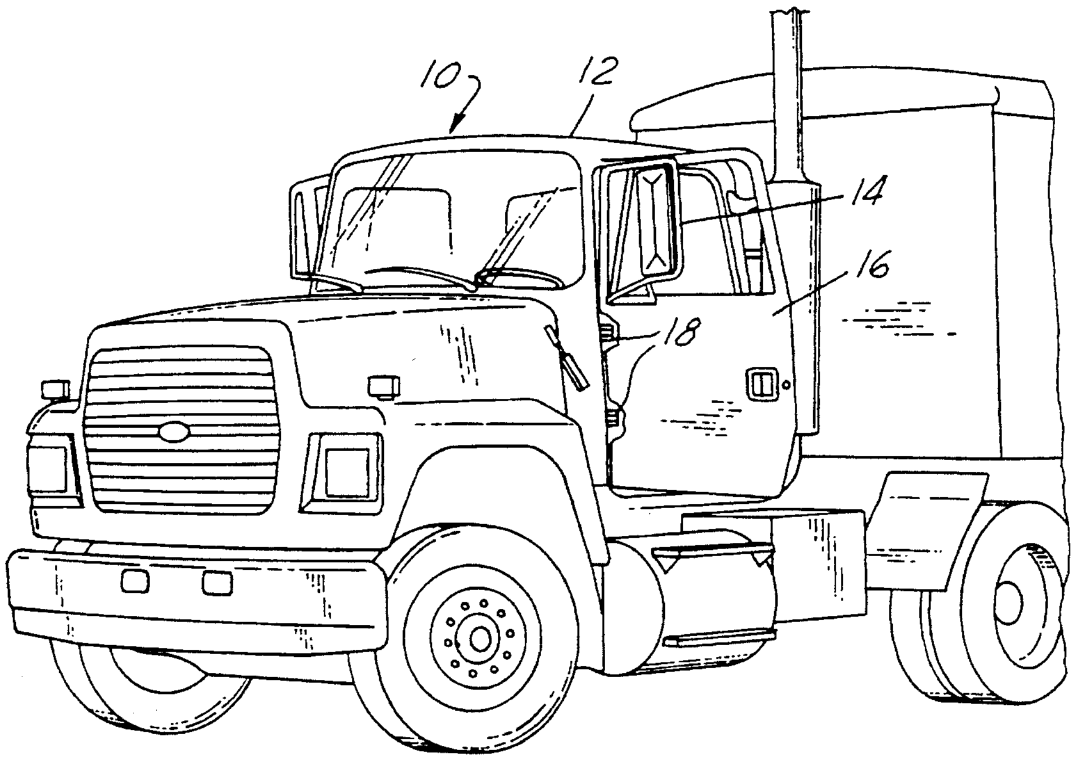
FIG. 1 is a perspective view of a heavy truck with the door to its cab in the open position.

Turning now to FIG. 1, a heavy truck 10 is illustrated as including a body 12 having a door aperture 14. The aperture 14 is closed in the conventional fashion by a door assembly 16 pivotally mounted as by a hinge means represented by vertically aligned upper and lower hinges 18.

Figure 2:
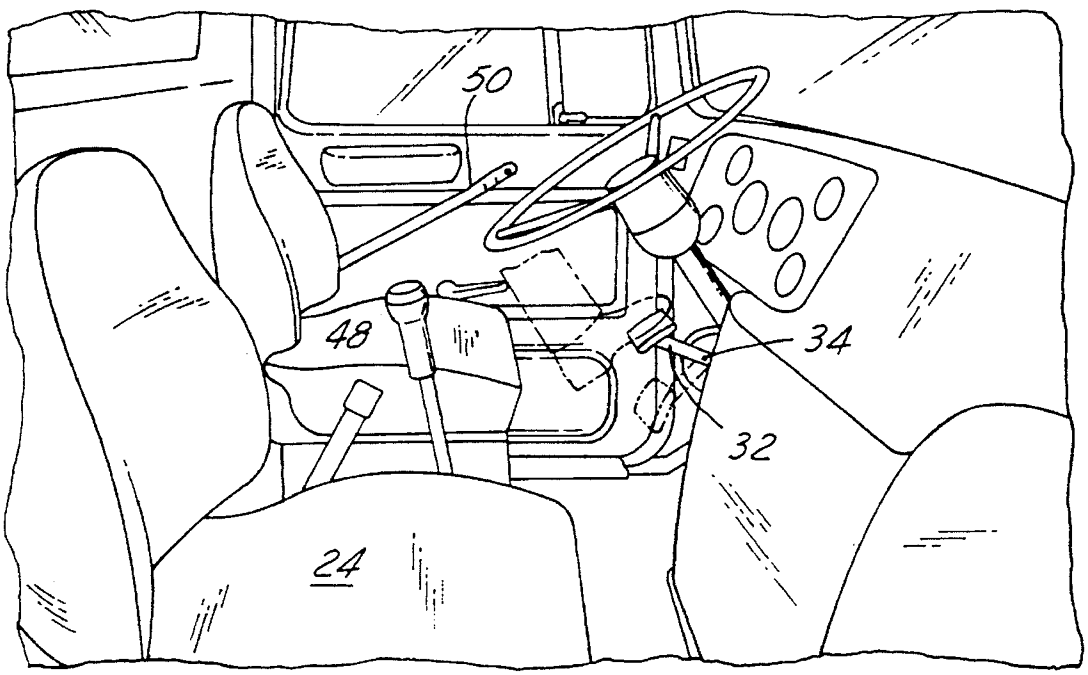
FIG. 2 is an interior view of the cab of the truck of FIG. 1.
Figure 3:
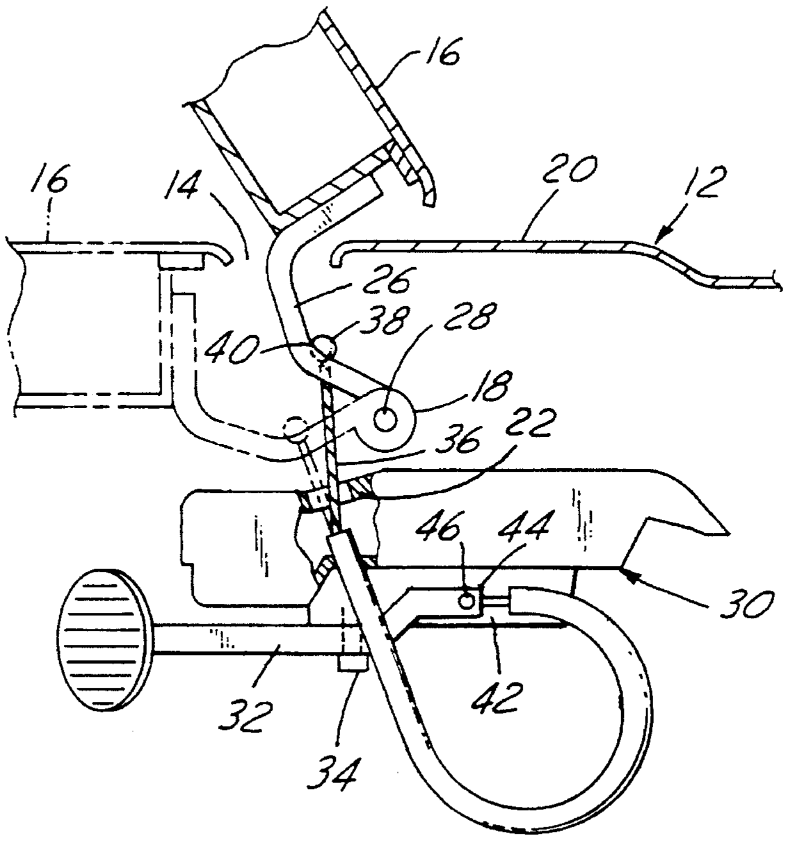
FIG. 3 is a cross-sectional view taken through the hinge area of the door of the truck in FIG. 1.

The body 12 may be of conventional construction and preferably includes an outer panel 20 and an inner panel 22, the panels being pierced by the door aperture 14 for permitting ingress and egress from the passenger compartment, indicated generally at 24 in FIG. 2, as being bounded by the vehicle body 12. The hinge 18 is preferably mounted in a known fixed manner (not shown) between the outer panel 20 and the inner panel 22 to support the door 16 for pivotal movement between the open position as shown in solid line in FIG. 3, and the closed position shown in dotted line. Many known configurations of hinge 18 may be selected, but the chosen hinge must provide an arm portion 26 fixedly secured to the door 16 and pivotally mounted about an axis 28. Mounted interiorly of the inner panel 22 within the passenger compartment 24 of the truck 10 is a closer mechanism, indicated generally at 30. It is preferably fixedly secured to the inner panel 22 and may include any suitable form of mechanism motion transmitting device such as the mechanism utilized to actuate parking brakes. According to the preferred embodiment, the closer mechanism 30 essentially provides a pedal 32 pivotally mounted as indicated at 34 thereto. The closer mechanism further includes a nonextensible cable member 36 having one end 38 fixedly secured to the aim 26, as indicated by the ball 40, and another end 42 fixedly secured to an end of the pedal, indicated at 44 as through ball 46.

In operating the heavy truck. 10, an operator may open the door 16 from the outside to the position shown in FIG. 1, and may enter the passenger compartment 24 to a position on the seat, indicated at 48. If the door 16 is in a position close to closing, the operator may grasp a portion of the door assembly 16, such as the pull 50 shown in FIG. 2, to pull the door to a closed position. When the door assembly 16 is wide open, however, the operator, through operation of the operator's foot, as indicated in phantom in FIG. 2, may depress the pedal 34 from the solid line position in FIG. 2, downwardly to the phantom line position in FIG. 2. This effects motion transmittal between the pedal and the arm 26 of the hinge 18 through exerting tension along the cable 36. It is preferred that when the door assembly 16 is brought to the closed position in FIGS. 2 and 3, that release of the operator's foot from the pedal 34 removes all tension from cable 36 and accordingly pivotally moving the door from the closed position to the open position may be accomplished in the manner of totally free movement, that is, pivotal movement is not resisted by the closer mechanism 30 except for part friction.

While only one embodiment of the door closer of the present invention has been shown and described, others may be possible without departing from the scope of the following claims.

What is claimed is:

1. A door closer mechanism for a vehicle having a body defining a passenger compartment, the body including inner and outer panels bounding the passenger compartment and having a door aperture formed therethrough closable by a door, the mechanism comprising:

a hinge assembly carried between said inner and outer panels pivotally supporting said door for swingable movement between an open position and a closed position; and closer means fixedly carried on said inner panel and operative to permit free movement of said door from said closed position to said open position and to drivingly engage said hinge assembly to effect movement of said door from said open position to said closed position.

2. A door closer mechanism as defined in claim 1, wherein said closer means comprises a cable having one end fixedly secured to said hinge assembly and another end.

3. Door closer mechanism as defined in claim 2, wherein said closer means includes a pedal member pivotally mounted with respect to said body and having a portion fixedly secured to said cable other end.

4. A door closer mechanism as defined in claim 1, wherein said closer means is mounted forward of said door aperture.

5. A door closer mechanism as defined in claim 3, wherein said closer means is mounted forward of said door aperture.

6. A door closer mechanism for a vehicle having a body defining a passenger compartment, the body including inner and outer panels bounding the passenger compartment and having a door aperture formed therethrough closable by a door, the mechanism comprising:

a hinge assembly carried between said inner and outer panels pivotally supporting said door for swingable movement between an open position and a closed position;

a cable having one end fixedly secured to said hinge assembly and another end; and closer means carried on said inner panel operative to permit free movement of said door from said closed position to said open position and to drivingly engage said hinge assembly to effect movement of said door from said open position to said closed position, said closer means including a pedal member pivotally mounted therewith.

7. A door closer mechanism as defined in claim 6, wherein said closer means is mounted forward of said door aperture.

8. A door closer mechanism as defined in claim 6, wherein said cable is loaded in tension during operation to drivingly engage said hinge assembly to effect movement of said door from said open position to said closed position.

9. A door closer mechanism as defined in claim 6, wherein said cable is loaded in tension during operation to drivingly engage said hinge assembly to effect movement of said door from said open position to said closed position.

10. A door closer mechanism as defined in claim 2, wherein said cable is loaded in tension during operation to drivingly engage said hinge assembly to effect movement of said door from said open position to said closed position.

* * * * *